(12) United States Patent
Nunome et al.

(10) Patent No.: US 8,709,646 B2
(45) Date of Patent: Apr. 29, 2014

(54) ALKALINE BATTERY

(75) Inventors: Jun Nunome, Kyoto (JP); Fumio Kato, Osaka (JP); Machiko Tsukiji, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/816,643

(22) PCT Filed: Aug. 21, 2012

(86) PCT No.: PCT/JP2012/005223
§ 371 (c)(1),
(2), (4) Date: Feb. 12, 2013

(87) PCT Pub. No.: WO2013/057860
PCT Pub. Date: Apr. 25, 2013

(65) Prior Publication Data
US 2013/0236775 A1   Sep. 12, 2013

(30) Foreign Application Priority Data
Oct. 21, 2011  (JP) .................. 2011-231391

(51) Int. Cl.
*H01M 10/24* (2006.01)
(52) U.S. Cl.
USPC ........................................ 429/185
(58) Field of Classification Search
None
See application file for complete search history.

(56) References Cited

U.S. PATENT DOCUMENTS

| 2005/0227145 A1 | 10/2005 | Iwamoto et al. |
| 2008/0193847 A1 | 8/2008 | Suetsugu et al. |
| 2009/0202910 A1 | 8/2009 | Anglin et al. |
| 2009/0317711 A1 | 12/2009 | Kato |
| 2012/0141361 A1 | 6/2012 | Suetsugu et al. |

FOREIGN PATENT DOCUMENTS

| JP | 2000-306575 A | 11/2000 |
| JP | 2002-289186 A | 10/2002 |
| JP | 2007-141643 A | 6/2007 |
| JP | 2009-158257 A | 7/2009 |
| JP | 2010-153287 A | 7/2010 |
| JP | 2011-068552 A | 4/2011 |
| JP | 2011-511411 A | 4/2011 |

OTHER PUBLICATIONS

International Search Report mailed Sep. 25, 2012 issued in corresponding International Application No. PCT/JP2012/005223.

*Primary Examiner* — Patrick Ryan
*Assistant Examiner* — Wyatt McConnell
(74) *Attorney, Agent, or Firm* — McDermott Will & Emery LLP

(57) ABSTRACT

In an alkaline battery in which a positive electrode 2 made of manganese dioxide and a negative electrode 3 are contained in a cylindrical battery case 1 having a closed bottom with a separator 4 interposed between the positive and negative electrodes 2 and 3, and an opening 1b of the battery case 1 is sealed via a sealing plate with a gasket 5 interposed between the battery case 1 and the sealing plate, a thickness of a body 1a of the battery case 1 is in a range of 0.10-0.17 mm, and a half-width of a 110 plane of the manganese dioxide measured by powder X-ray diffraction is in a range of 2.30-2.70 degrees.

3 Claims, 2 Drawing Sheets

ALKALINE BATTERY

RELATED APPLICATIONS

This application is the U.S. National Phase under 35 U.S.C. §371 of International Application No. PCT/JP2012/005223, filed on Aug. 21, 2012, which in turn claims the benefit of Japanese Application No. 2011-231391, filed on Oct. 21, 2011, the disclosures of which Applications are incorporated by reference herein.

TECHNICAL FIELD

The present invention relates to high-capacity alkaline batteries.

BACKGROUND ART

Currently, alkaline batteries have been widely used as main power supply for, e.g., toys, game instruments, and portable electronic devices serving as daily commodities, and are desired to have a long life when being used in a device. To achieve a long driving time of a device, the amount of an active material with which the interior of a battery is filled needs to be increased, and the content of manganese dioxide serving as a positive electrode active material needs to be increased.

By contrast, for example, PATENT DOCUMENT 1 describes a technique in which the capacity is increased by optimizing the ratio of graphite added and pores.

Furthermore, PATENT DOCUMENT 2 describes a technique in which the thickness of a body of a battery case is reduced, and the filling density of graphite is defined to increase capacity and reduce the swelling of the battery case.

Furthermore, PATENT DOCUMENT 3 describes a technique in which the half-width and potential of a 110 plane of a crystal structure of manganese dioxide are set in a predetermined range to improve the discharge performance under an intermediate load, and PATENT DOCUMENT 4 describes a technique in which the ratio between the peak intensity of a 110 plane and that of a 021 plane is set in a predetermined range to improve the discharge performance under a high load and a low load.

CITATION LIST

Patent Documents

PATENT DOCUMENT 1: Japanese Patent Publication No. 2011-511411
PATENT DOCUMENT 2: Japanese Patent Publication No. 2009-159257
PATENT DOCUMENT 3: Japanese Patent Publication No. 2011-68552
PATENT DOCUMENT 4: Japanese Translation of PCT International Application No. 2007-141643

SUMMARY OF THE INVENTION

Technical Problem

In order to increase the capacity, the amount of an active material needs to be increased, e.g., by reducing the thickness of a body of a battery case. However, unlike devices using lithium-ion batteries, etc., many of devices using alkaline batteries do not include an advanced control circuit, and thus, such batteries tend to be discharged to a deep depth of discharge, i.e., deeply discharged. When a leakage current flows through a circuit in such a device, a battery is inevitably used until being more deeply discharged.

It has been known that crystals of manganese dioxide swell with discharge to thereby swell an entire positive electrode. With increasing depth of discharge, the degree of the swelling of the positive electrode increases, and since there exist devices which cannot control the depth of discharge as described above, the swelling of the positive electrode of a deeply discharged battery cannot be ignored. Specifically, when the discharge capacity is to be increased by increasing the amount of manganese dioxide, the swelling of the positive electrode is faced. Thus, when the positive electrode excessively swells, a battery case is pressed, and if a body of the battery case is thin, a problem where the outside diameter of the battery case increases occurs.

PATENT DOCUMENT 2 describes that when the ratio of graphite added is in a predetermined range, graphite absorbs the swelling of manganese dioxide to reduce the swelling of a battery case. However, the density of graphite in a positive electrode forming a portion of a usual alkaline battery has already been increased, and thus, the swelling of manganese dioxide of the deeply discharged battery may be insufficiently reduced especially in a region of the positive electrode having a low ratio of graphite added. While the graphite density corresponding to the graphite amount per volume ($g/cm^3$) is taken into account, the amount of pores also actually affects the absorption depending on the molded density of a pellet of the positive electrode. Thus, with increasing density at which the pellet is molded, the swelling of manganese dioxide which can be absorbed by cavities is reduced, and thus, stresses on, e.g., the battery case (the outer surface of the positive electrode) and a separator (the inner surface of the positive electrode) due to the swelling of manganese dioxide increase. Furthermore, the ratio of graphite added significantly affects, e.g., a balance between high rate discharge and low rate discharge, and storage performance; therefore, an easy change in the ratio may degrade other capabilities, and it may be thus difficult to change the ratio. The balance generally means that while the conductivity of the positive electrode is improved at a high ratio of graphite added to enhance high rate discharge characteristics, the amount of manganese dioxide is reduced to thereby degrade low rate discharge characteristics.

The inventors of this application recognized that in order to increase the discharge capacity of an alkaline battery, the thickness of a body of a battery case initially needs to be reduced to increase the internal volume of the battery, and such a reduction in the thickness leads to a problem where the outside diameter of the battery case is excessively increased after deep discharge of the battery due to the swelling of manganese dioxide. Furthermore, the inventors of this application intensively studied a technique for reducing the swelling of a battery case while maintaining high capacity without increasing the ratio of graphite added and reducing the filling density of manganese dioxide.

Specifically, AA alkaline batteries having a size (e.g., 14.3 mm) close to the largest battery outside diameter (14.5 mm) specified in the Japanese Industrial Standards (JIS) were prototyped, the batteries were then each inserted into a battery storage portion of a used device, and the batteries were then discharged under a certain load until the voltages of the batteries reach a predetermined voltage (e.g., 0.6 V); thus, the inventors found that some of the discharged batteries cannot be smoothly removed from the battery storage portion.

Examination of the reason for this showed that the outside diameter of a discharged battery in which the thickness of a body of a battery case is reduced is larger (typically, about 0.08 mm larger) than that of the battery before being discharged. This phenomenon will be described hereinafter with reference to FIG. 2.

It has been known that a positive electrode using manganese dioxide as an active material swells due to discharge reaction; as illustrated in FIG. 2, while a side surface of a positive electrode 2 is pressed by a battery case 1, an upper surface of the positive electrode 2 (near a sealing portion of the battery case 1) is open, and thus, the positive electrode 2 swells upward in the drawings, i.e., toward the sealing portion. However, a reduction in the thickness of a body 1a of the battery case 1 reduces the force with which the side surface of the positive electrode 2 is pressed, and thus, the positive electrode 2 swells also in a radial direction of the battery. This increases the outside diameter of the discharged battery in which the body thickness of the battery case 1 is reduced.

Furthermore, examination of the relationship between a battery storage portion of a device driven by using an AA battery as a power supply and AA batteries showed that many of batteries having an outside diameter exceeding about 14.35 mm could not be smoothly inserted into the device. Specifically, it was found that such batteries having the largest battery outside diameter (14.5 mm) specified in the JIS were not practical.

It is therefore a principal object of the present invention to provide a high-performance and convenient alkaline battery in which the body thickness of a battery case is reduced to improve the discharge capacity, and which is configured to reduce an increase in the outside diameter of the discharged battery, and is easily removed from a battery storage portion of a device.

Solution to the Problem

In order to achieve the object, the present invention is directed to an alkaline battery in which a positive electrode made of manganese dioxide and a negative electrode are contained in a cylindrical battery case having a closed bottom with a separator interposed between the positive and negative electrodes, and an opening of the battery case is sealed via a sealing plate with a gasket interposed between the battery case and the sealing plate. A thickness of a body of the battery case is in a range of 0.10-0.17 mm, and a half-width of a 110 plane of the manganese dioxide measured by powder X-ray diffraction is in a range of 2.30-2.70 degrees.

Advantages of the Invention

According to the present invention, a high-capacity alkaline battery in which the thickness of a body of a battery case is reduced, and which is configured to reduce an increase in the outside diameter of the discharged battery, and is easily removed from a battery storage portion of a device can be achieved.

DESCRIPTION OF EMBODIMENT

Figure 1:
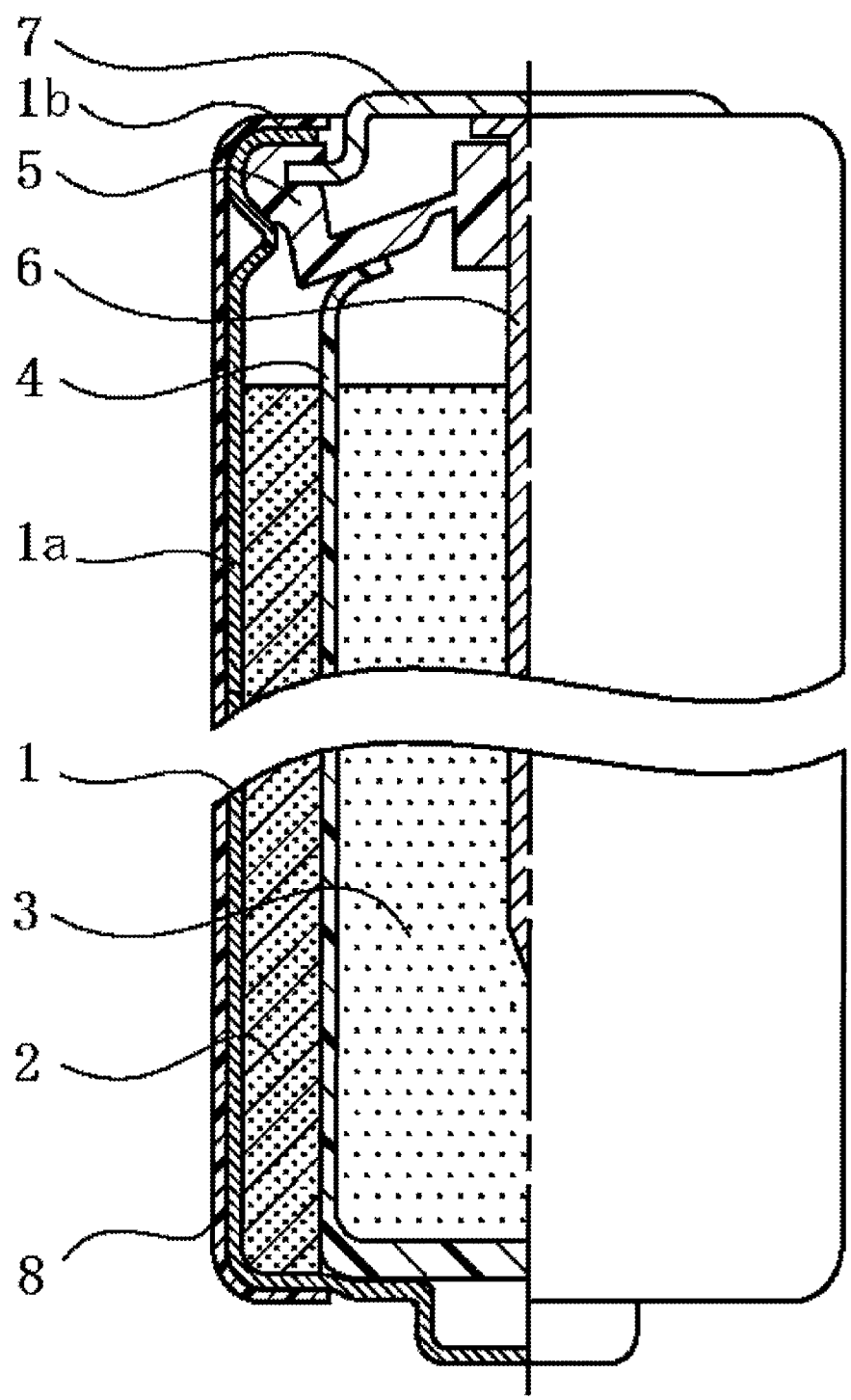
FIG. 1 is a half cross-sectional view illustrating a structure of an alkaline battery according to the present invention.
Figure 2:
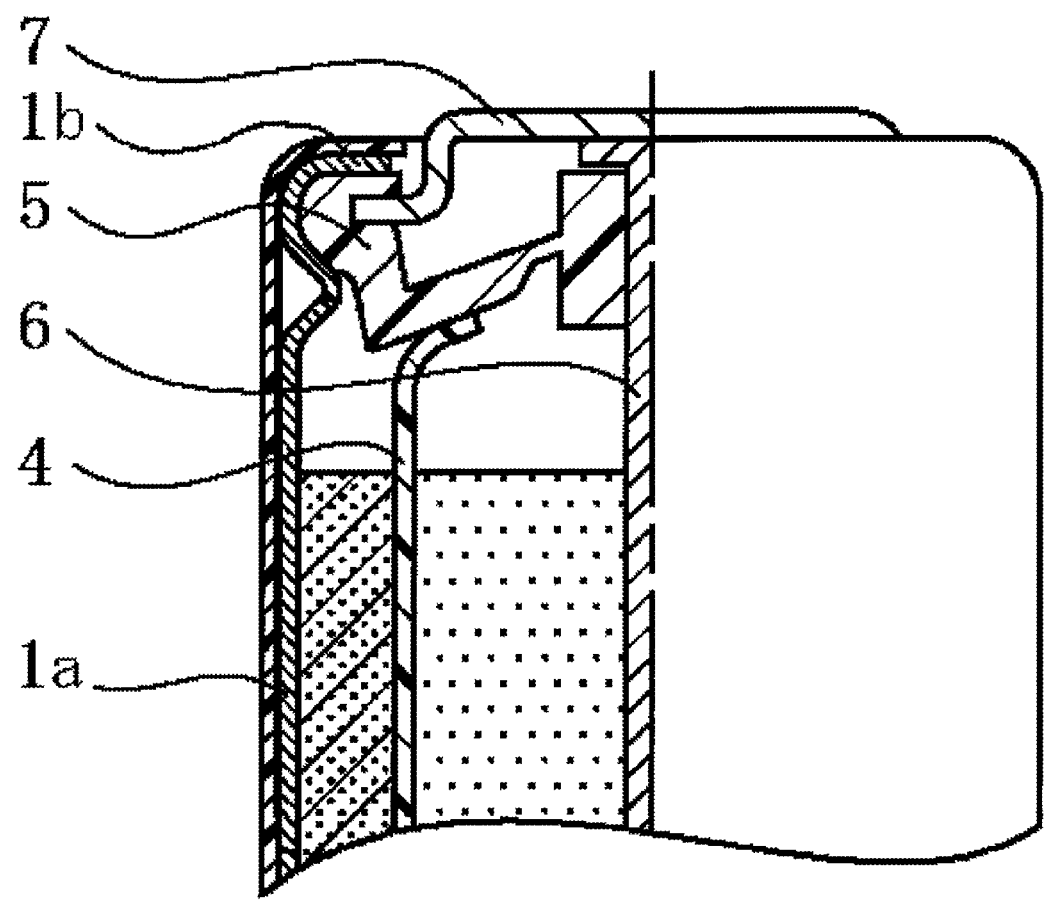
FIG. 2 is a partial cross-sectional view of an alkaline battery for explaining a problem to be solved by the present invention.

The present invention is directed to an alkaline battery configured such that a positive electrode made of manganese dioxide and a negative electrode are housed in a cylindrical battery case having a closed bottom with a separator interposed between the positive and negative electrodes, and an opening of the battery case is sealed via a sealing plate with a gasket interposed between the battery case and the sealing plate. A feature of the present invention is that the thickness of a body of the battery case is in the range of 0.1-0.17 mm, and the half-width of a 110 plane of manganese dioxide measured by powder X-ray diffraction is in the range of 2.30-2.70 degrees.

The half-width is more preferably in the range of 2.40-2.62 degrees.

The reason why, if the half-width of the 110 plane of manganese dioxide measured by powder X-ray diffraction is in a predetermined range, the above problem is solved is as follows. Here, the 110 plane of the crystal structure of manganese dioxide represents a clear peak which is seen at an angle $2\theta$ of about $22\pm1°$ by powder X-ray diffraction measurement, and is used to represent a plane corresponding to a 110 plane when manganese dioxide has been assumed to have a ramsdellite structure.

Manganese dioxide having a gamma crystal structure is usually used as manganese dioxide for use in an alkaline battery. In recent years, in order to improve the discharge performance under a high load, use of manganese dioxide called epsilon manganese dioxide and having a crystal structure with a high concentration of Mn vacancies is preferred.

It has been known that when Mn vacancy sites are formed in regular arrangements of Mn and O atoms of manganese dioxide, hydrogen ions are placed at the sites to thereby hasten the conduction of hydrogen ions through solid phase manganese dioxide. However, the Mn vacancies increase due to, e.g., crystal strains and misalignment of arrayed atoms during preparation of manganese dioxide, and are provided under the conditions where crystal growth is difficult to proceed. Therefore, it can be said that manganese dioxide conventionally used based on the discharge performance under a high load has relatively low crystallinity.

The situation where the peak half-width of a 110 plane measured by powder X-ray diffraction is small represents that crystals are regular arrays. Specifically, the situation means that the arrangements of Mn and O atoms are regular, and that primary crystal particles are large, and thus, the level of disorder in atomic arrangement due to microparticulation is low. H atoms enter the arrangements of Mn and O atoms in the last stage of discharge, and thus, the distance between the atoms increases, thereby allowing strains to be within the crystal to reduce breaks in the crystal particles.

Conversely, when the peak half-width is large, the phenomenon occurs where the insertion of H atoms arising from discharge causes crystal particles to be distorted due to strains arising from a variation in the distance between atoms in a crystal, or causes the size of crystal particles to apparently increase. Therefore, considering that a positive electrode mixture swells in the last stage of discharge, the swelling of the positive electrode mixture is reduced with decreasing half-width of a 110 plane measured by powder X-ray diffraction.

The negative electrode is more preferably made of zinc, and the ratio of the theoretical capacity of the negative electrode to that of the positive electrode is more preferably 1.07-1.17.

The reason for this is that both of the positive and negative electrodes chemically change and swell by a discharge reaction in the battery, and when a balance is achieved between the phenomenon in the positive electrode and that in the negative electrode, the discharge capacity of the battery is highest, and the swelling of the electrodes is reduced.

For example, when the ratio is greater than 1.17, the capacity of the negative electrode is excessively high, and thus, the positive electrode is excessively discharged; therefore, while the battery is excessively filled with the negative electrode, a drop in the potential of the positive electrode occurs earlier, and thus, the discharge capacity is reduced. Manganese dioxide significantly swells, because the battery is more deeply discharged to a predetermined voltage. By contrast, when the ratio is less than 1.07, a drop in the voltage of the negative electrode excessively early occurs, and when the depth of discharge of the positive electrode made of manganese dioxide is shallow, the battery finishes being discharged; therefore, the discharge capacity does not increase.

In one preferred embodiment, the outside diameter of an alkaline battery is in the range of 14.10-14.34 mm. The outside diameter of a body of a battery case is in the range of 13.95-14.19 mm. Thus, discharged batteries providing a higher capacity can be smoothly removed from a battery storage portion of a used device, thereby obtaining more practical batteries.

An embodiment of the present invention will be described hereinafter with reference to the drawings. In the following drawings, components having substantially the same function are indicated by the same reference characters for the sake of easy description. The present invention is not limited to the following embodiment.

FIG. 1 is a half cross-sectional view schematically illustrating a structure of an alkaline battery according to an embodiment of the present invention.

As illustrated in FIG. 1, a positive electrode 2 and a negative electrode 3 are housed in a cylindrical battery case 1 having a closed bottom with a separator 4 interposed between the positive and negative electrodes, and an opening 1b of the battery case 1 is sealed via a gasket 5 and a negative electrode terminal plate (sealing plate) 7.

Here, the thickness of a body 1a of the battery case 1 is in the range of 0.10-0.17 mm, and thus, the discharge capacity of the battery can be increased. The positive electrode 2 is made of manganese dioxide, and the half-width of a 110 plane of manganese dioxide measured by powder X-ray diffraction is in the range of 2.30-2.70 degrees.

Thus, an increase in the outside diameter of the discharged battery can be reduced. As a result, even when a battery having an outside diameter close to the largest outside diameter specified in the JIS is inserted into a battery storage portion of a used device, the discharged battery can be smoothly removed from the battery storage portion.

Here, the outside diameter of the alkaline battery is preferably in the range of 14.1-14.34 mm. The outside diameter of the body 1a of the battery case 1 is preferably in the range of 13.95-14.29 mm.

The body 1a of the battery case 1 is thinner than a portion of the battery case 1 in the vicinity of the opening 1b. Furthermore, the thickness of the body 1a of the battery case 1 is preferably reduced by 15% or more of the thickness of the portion of the battery case 1 in the vicinity of the opening 1b. This makes it easy to maintain the strength of the sealing portion of the battery having a high internal volume and providing a high capacity.

The positive electrode 2 is made of a material obtained by adding at least graphite to manganese dioxide, and the ratio of graphite added into the positive electrode is preferably in the range of 3.5-7.0% by mass. The reason for this is that graphite added into the positive electrode acts not only to improve the electron conduction through the positive electrode, which is required for a discharge reaction, but also as a binder used to form the positive electrode in the shape of a pellet and maintain the shape.

When graphite powder particles are pressed, the graphite particles are compressed up to 2.26 g/cc which is the true density, and the positive electrode is formed to a very high density in a step of forming a positive electrode pellet. If the density of the formed positive electrode is very low, or if the ratio of graphite added is high to some extent, this effectively reduces the swelling of the positive electrode due to manganese dioxide in the last stage of discharge. However, the inventors of this application found that if the positive electrode is highly filled, and the amount of manganese dioxide is increased, it is more effective to reduce the swelling of manganese dioxide itself.

The half-width of the 110 plane of manganese dioxide measured by powder X-ray diffraction represents the half-width of the diffraction line of the 110 plane at an angle 2θ of about 22±1° in a diffraction pattern which is obtained by measuring manganese dioxide powder by X-ray diffraction using CuKα radiation as a light source. Alternatively, the half-width of the 110 plane of manganese dioxide can be obtained also from a positive electrode mixture taken from the interior of a disassembled battery which has not been used yet. In this case, after the disassembling of the battery, an alkaline electrolyte solution may be immediately washed away, and the positive electrode mixture dried in a dry atmosphere at room temperature may be measured by X-ray diffraction.

For example, the type and particle size of graphite added into manganese dioxide are not particularly limited; however, high-purity artificial graphite having an average particle size of 10-25 μm is preferably used, because the positive electrode is easily formed. Alternatively, scalelike pieces of natural graphite having the same size, or expanded graphite may be used. Furthermore, carbon black, carbon fibers, etc., may be added as a conductive material for the positive electrode, polyethylene powder, etc., may be added as a binder, and stearate, etc., may be added as a lubricant.

For example, the crystal structure and particle size of manganese dioxide are not particularly limited, and beta manganese dioxide, gamma manganese dioxide, lambda manganese dioxide, delta manganese dioxide, or epsilon manganese dioxide can be used. Alternatively, not only manganese dioxide, but also nickel oxyhydroxide, silver oxide, copper oxide, etc., may be used as positive electrode active materials. High-density electrolytic manganese dioxide offering superior discharge performance is preferably used.

It is desirable that manganese dioxide according to the present invention exhibits necessary battery performance, and allows insignificant swelling of the positive electrode in the last stage of discharge (for example, continuous discharge under a load of 43Ω until the battery voltage reaches 0.6 V). Manganese dioxide preferably has an average particle size of 30-60 μm, and more preferably has a particle size of 35-45 Mn preferably has a higher degree of oxidation, and preferably exhibits a valence of 3.9-4.0. The potential of a Hg/HgO reference electrode measured in 34% KOH aqueous solution at 23° C. is preferably 250-280 mV.

The half-width of the 110 plane of manganese dioxide measured by powder X-ray diffraction is more preferably in the range of 2.40-2.62 degrees.

The mass loss rate at high temperature (100-400° C.), which reflects the concentration of Mn vacancies in manganese dioxide, is preferably in the range of 3.1-3.9% in terms of discharge performance, and is more preferably in the range of 3.2-3.7%.

The BET specific surface area of manganese dioxide is preferably 22-34 $m^2/g$. Furthermore, about 0.02-0.5% of particles of anatase titanium dioxide, rutile titanium dioxide, metatitanic acid, or barium titanate is preferably added into the positive electrode, because such addition can reduce side reaction caused by discharge of the positive electrode in the last stage of discharge.

In the present invention, a negative electrode is not particularly limited: however, if an alkaline battery is taken as an example, a negative electrode of the battery is preferably a powder zinc electrode gelled with an alkaline electrolyte solution and a gelling agent, and the ratio of the discharge capacity of the negative electrode to that of the positive electrode, i.e., the ratio of the theoretical discharge capacity of the positive electrode to that of the negative electrode, is preferably 1.00-1.25. The ratio is more preferably 1.07-1.17, because the discharge performance is high. In this case, the discharge capacity is based on the assumption that the theoretical discharge capacity of manganese dioxide is 284 mAh/g, and the theoretical discharge capacity of zinc is 710 mAh/g.

While the present invention is configured to reduce the problem occurring with a reduction in the thickness of the body 1a of the battery case 1, i.e., an increase in the outside diameter of a discharged battery, the portion of the battery case 1 in the vicinity of the opening 1b is preferably thicker than the body 1a of the battery case 1 to prevent a reduction in the strength of the crimped sealing portion of the battery case 1. In this case, the thickness of the body 1a of the battery case 1 is preferably reduced by 15% or more of the thickness of the portion of the battery case 1 in the vicinity of the opening 1b.

An aqueous solution containing potassium hydroxide as the main ingredient can be used as an electrolyte, and an aqueous solution containing 32.5-34.5% by mass of potassium hydroxide, and 1.0-3.0% by mass of zinc oxide is preferably used. A small amount of a silica compound is more preferably added into the negative electrode, because such addition reduces the swelling of the positive and negative electrodes. Specifically, 0.1-0.3% by mass of $NaSiO_2$ is preferably added.

The positive electrode pellet preferably has a crack having a size of 2-10 μm and formed in a (second pressing) process step of inserting the formed positive electrode pellet into the battery case and again pressing it in the battery case. Specifically, in an AA battery, the positive electrode pellet is preferably again formed in the battery case under a weight of 0.4-1.5 t, because such formation reduces the stress of swelling of manganese dioxide due to discharge.

Here, for example, a nonwoven fabric sheet formed by mixing various artificial fibers, or a porous sheet made of a synthetic resin, such as cellophane or a polyolefine resin, can be used as the separator.

EXAMPLES

The structure and advantages of the present invention will be further described hereinafter using examples of the present invention. The present invention is not limited to these examples.

An AA alkaline battery (LR6) illustrated in FIG. 1 was fabricated using the procedure including the following steps <1> to <7>.

<1> Battery Case

A cylindrical battery case 1 having a closed bottom was formed from a nickel-plated steel plate by pressing. A body 1a of the battery case 1 and a portion of the battery case 1 in the vicinity of an opening 1b each had a predetermined thickness.

<2> Separator

A cylindrical separator 4 having a closed bottom was formed by winding three turns of a nonwoven fabric sheet obtained by principally mixing solvent spun cellulose fibers and polyvinyl alcohol fibers in a mass ratio of 1:1 and having a basic weight of 25 $g/m^2$ and a thickness of 0.09 mm.

<3> Sealing Unit

A gasket 5 containing nylon 6.6 as the main ingredient was formed by injection-molding ingredients into a predetermined shape with predetermined dimensions. A negative electrode terminal plate 7 was formed by pressing a nickel-plated steel plate into a predetermined shape with predetermined dimensions, a negative electrode current collector 6 was formed by pressing brass into a nail shape, and the surface of the negative electrode current collector 6 was tinned. The negative electrode current collector 6 was electrically welded to the negative electrode terminal plate 7, and then, the negative electrode current collector 6 was press-fitted into a through hole in the center of the gasket 5 to thereby fabricate a sealing unit.

<4> Alkaline Electrolyte Solution

An alkaline electrolyte solution made of an aqueous solution containing a predetermined amount of potassium hydroxide and a predetermined amount of zinc oxide was prepared.

<5> Fabrication of Positive Electrode

Manganese dioxide powder having an average particle size of 40 μm and graphite powder were mixed in a predetermined mass ratio. The resultant mixture and the alkaline electrolyte solution were mixed in a mass ratio of 100:1.9, were fully stirred, and then, were compressed into flakes. Thereafter, the positive electrode mixture flakes were pulverized into granules, and the granules were press-molded into a hollow cylindrical shape to obtain a pellet-shaped positive electrode 2.

Electrolytic manganese dioxide prepared in the following manner was used as manganese dioxide powder. A round-bottom separable flask having a volume of 2 L was used as an electrolytic bath, a titanium sheet having a length of 5 cm, a width of 5 cm, and a thickness of 1 mm was used as an anode, and platinum sheets having a length of 3 cm, a width of 3 cm, and a thickness of 0.2 mm were used as cathodes. A pair of the cathodes were spaced 2 cm apart from the lateral sides of the anode. An aqueous solution having a sulfuric acid concentration of 15 g/L and a manganese sulfate concentration of 70 g/L was used as a solution for the electrolytic bath at the start of electrolysis. Reagent chemicals made by KANTO CHEMICAL CO., INC. were used as both of manganese sulfate and sulfuric acid. In view of a change due to an electrolysis reaction, the concentration of hydrogen ions (sulfuric acid concentration) was changed at a substantially constant rate such that the sulfuric acid concentration reached 19 g/L at the end of 24-hour electrolysis. Here, sulfuric acid, pure water, and a solution of manganese sulfate were supplied to the electrolytic bath at a substantially constant rate. The manganese sulfate concentration was kept at a fixed value between the start and end of electrolysis. The electrolysis temperature was set at 95±1° C. by adjusting the temperature of the electrolytic bath with a mantle heater, and electrolysis was continuously carried out for 24 hours. The electrolytic current density was set at a certain value between 21 A/m² and 50 A/m².

After completion of the electrolysis, manganese dioxide was separated from the titanium sheet and coarsely ground into pieces having a size of about 300 μm, and the pieces were washed with ion exchanged water having a temperature of 60° C., and were neutralized by decantation until the pH of the aqueous solution reached 6. Thereafter, the manganese dioxide was dried and ground into powder having an average particle size of 40 μm. Ion exchanged water having a volume of 100 mL was added to the powder having a weight of 10 g. While the resultant mixture was stirred, a sodium hydroxide aqueous solution having a concentration of 0.1 N was dropped onto the mixture, and the mixture was neutralized until the pH of a supernatant fluid of the mixture reached 6. Thereafter, the powder was dried with hot air having a temperature of 90° C. for two hours to obtain manganese dioxide for use in the positive electrode.

Electrolytic manganese dioxides having 110 planes with half-widths of 2.11°, 2.21°, 2.30°, 2.40°, 2.42°, 2.62°, 2.65°, 2.70°, and 2.80° measured by powder X-ray diffraction were prepared by changing the electrolytic current density to 21 A/m², 25 A/m², 29 A/m², 33 A/m², 34 A/m², 42 A/m², 43 A/m², 45 A/m², and 50 A/m².

<6> Preparation of Gelled Negative Electrode

A gelling agent (a thickener made of cross-linked and branched polyacrylic acid, and a water-absorbent polymer made of highly cross-linked chain sodium polyacrylate), an alkaline electrolyte solution, and zinc alloy powder were mixed in a mass ratio of 0.26:0.54:35.2:64.0 to obtain a negative electrode 3. The used zinc alloy powder contained 0.02% by mass of indium, 0.01% by mass of bismuth, and 0.005% by mass of aluminum.

<7> Assembly of Alkaline Battery

A pellet-shaped positive electrode 2 was inserted into a battery case 1, and pressed with a pressing tool to bring the positive electrode 2 into close contact with an inner wall of the battery case 1. A separator 4 was disposed in a central portion of the positive electrode 2 brought into close contact with the inner wall of the battery case 1, and then, the internal space of the separator 4 was filled with a predetermined amount of a negative electrode 3. An opening of the battery case 1 was sealed via a sealing unit by crimping the open end of the battery case 1, and then, the outer surface of the battery case 1 was coated with an exterior label 8.

(1) Relationship Between Thickness of Body of Battery Case and Half-Width of 110 Plane of Manganese Dioxide Batteries 1-8 were each fabricated using the procedure including the above-described steps <1> to <7> except that the thickness of a body of a battery case was in the range of 0.10-0.20 mm, and that manganese dioxide the half width of a 110 plane of which was 2.40° or 2.80° was used as manganese dioxide of a positive electrode.

In order to determine the outside diameters of these batteries after being deeply discharged, the batteries were each discharged under a load of 43Ω until the battery voltage reached 0.60 V, and the largest outside diameters of the batteries before and after being discharged were measured to determine the increment between the largest outside diameter of each of the batteries before being discharged and that of a corresponding one of the discharged batteries. Table 1 shows measurement results.

TABLE 1

| | THICKNESS OF BODY OF BATTERY CASE [mm] | HALF-WIDTH OF 110 PLANE OF MANGANESE DIOXIDE UNDER X-RAY DIFFRACTION [DEGREES] | RATIO OF GRAPHITE ADDED INTO POSITIVE ELECTRODE [%] | OUTSIDE DIAMETER OF DEEPLY DISCHARGED BATTERY [mm] | INCREMENT OF BATTERY OUTSIDE DIAMETER [mm] |
|---|---|---|---|---|---|
| BATTERY 1 | 0.20 | 2.80 | 6.0 | 14.31 | 0.01 |
| BATTERY 2 | 0.20 | 2.40 | 6.0 | 14.30 | 0.00 |
| BATTERY 3 | 0.17 | 2.80 | 6.0 | 14.35 | 0.05 |
| BATTERY 4 | 0.17 | 2.40 | 6.0 | 14.31 | 0.01 |
| BATTERY 5 | 0.15 | 2.80 | 6.0 | 14.37 | 0.07 |
| BATTERY 6 | 0.15 | 2.40 | 6.0 | 14.32 | 0.02 |
| BATTERY 7 | 0.10 | 2.80 | 6.0 | 14.39 | 0.09 |
| BATTERY 8 | 0.10 | 2.40 | 6.0 | 14.33 | 0.03 |

The results show that the outside diameter of each of the batteries 2, 4, 6, and 8 using manganese dioxide the half-width of a 110 plane of which is 2.40 is smaller than that of each of the batteries 1, 3, 5, and 7 using manganese dioxide the half-width of a 110 plane of which is 2.80, and is less than 14.35 mm to enable quick removal of each of the batteries 2, 4, 6, and 8 from a device into which the dry battery is inserted, and thus, swelling is reduced.

(2) Relationship Between Half-Width of 110 Plane of Manganese Dioxide and Ratio of Graphite Added into Positive Electrode Batteries 9-18 were each fabricated using the procedure including the above-described steps <1> to <7> except that the thickness of a body of a battery case was 0.15 mm, that manganese dioxide the half width of a 110 plane of which was 2.40° or 2.80° was used as manganese dioxide, and that the ratio of graphite added into a positive electrode was varied in the range of 3.5-7.0%.

The outside diameters of the deeply discharged batteries similar to those in the section (1) were determined. Furthermore, in order to determine the discharge performance of each of the batteries, the cycle in which the battery was discharged at a constant current of 250 mA for one hour, and a 23-hour pause was taken was repeated, and the time until the battery voltage reached 0.9 V was determined. The discharge performance of each of the batteries was determined at 20° C., and was represented by a relative value where the performance of the battery 9 is 100. Table 2 shows determination results.

TABLE 2

| | THICKNESS OF BODY OF BATTERY CASE [mm] | HALF-WIDTH OF 110 PLANE OF MANGANESE DIOXIDE UNDER X-RAY DIFFRACTION [DEGREES] | RATIO OF GRAPHITE ADDED INTO POSITIVE ELECTRODE [%] | OUTSIDE DIAMETER OF DEEPLY DISCHARGED BATTERY [mm] | INCREMENT OF BATTERY OUTSIDE DIAMETER [mm] | DISCHARGE PERFORMANCE [INDEX] |
|---|---|---|---|---|---|---|
| BATTERY 9  | 0.15 | 2.80 | 7.0 | 14.37 | 0.07 | 100 |
| BATTERY 10 | 0.15 | 2.40 | 7.0 | 14.32 | 0.02 | 101 |
| BATTERY 11 | 0.15 | 2.80 | 6.0 | 14.39 | 0.09 | 98  |
| BATTERY 12 | 0.15 | 2.40 | 6.0 | 14.32 | 0.02 | 102 |
| BATTERY 13 | 0.15 | 2.80 | 5.5 | 14.38 | 0.08 | 99  |
| BATTERY 14 | 0.15 | 2.40 | 5.5 | 14.32 | 0.02 | 103 |
| BATTERY 15 | 0.15 | 2.80 | 4.7 | 14.39 | 0.09 | 98  |
| BATTERY 16 | 0.15 | 2.40 | 4.7 | 14.32 | 0.02 | 103 |
| BATTERY 17 | 0.15 | 2.80 | 4.4 | 14.40 | 0.10 | 96  |
| BATTERY 18 | 0.15 | 2.40 | 4.4 | 14.33 | 0.03 | 105 |

The results show that the outside diameter of each of the deeply discharged batteries 9, 11, 13, 15, and 17 using manganese dioxide the half-width of a 110 plane of which was 2.80 degrees was larger than 14.35 mm, the degree of swelling of the battery was thus high, and the lower the ratio of graphite added was, the higher the degree of swelling of the battery was.

By contrast, the outside diameter of each of the batteries 10, 12, 14, 16, and 18 using manganese dioxide the half-width of a 110 plane of which was 2.40 degrees was less than 14.35, and the degree of swelling of a battery in which the ratio of graphite added is low (e.g., the battery 20) is also sufficiently reduced.

While the discharge performance of the battery 15 or 17 using manganese dioxide the half-width of a 110 plane of which is large, such as 2.80, tends to decrease with decreasing ratio of graphite added, the discharge performance of a battery using manganese dioxide the half-width of a 110 plane of which is small, such as 2.40, (e.g., the batteries 16 and 18) does not tend to decrease with decreasing ratio of graphite added.

This phenomenon shows that a reduction in conductivity due to the decreased ratio of graphite decreases the discharge performance even with increasing amount of manganese dioxide, and when the half-width of a 110 plane of used manganese dioxide is appropriate, the discharge performance is less likely to decrease with decreasing ratio of graphite added, and the degree of swelling of a deeply discharged battery is also reduced.

(3) Relationship Between Thickness of Body of Battery Case and Half-Width of 110 Plane of Manganese Dioxide Batteries 19-46 were each fabricated using the procedure including the above-described steps <1> to <7> except that the thickness of a body of a battery case was 0.10 mm or 0.17 mm, and that the half-width of a 110 plane of used manganese dioxide was varied between 2.11 degrees and 2.80 degrees. As above, the outside diameter of each of the deeply discharged batteries and the discharge performance of the battery were determined. Table 3 shows determination results.

TABLE 3

| | THICKNESS OF BODY OF BATTERY CASE [mm] | HALF-WIDTH OF 110 PLANE OF MANGANESE DIOXIDE UNDER X-RAY DIFFRACTION [DEGREES] | RATIO OF GRAPHITE ADDED INTO POSITIVE ELECTRODE [%] | OUTSIDE DIAMETER OF DEEPLY DISCHARGED BATTERY [mm] | INCREMENT OF BATTERY OUTSIDE DIAMETER [mm] | DISCHARGE PERFORMANCE [INDEX] |
|---|---|---|---|---|---|---|
| BATTERY 19 | 0.17 | 2.11 | 6.0 | 14.30 | 0.00 | 94  |
| BATTERY 20 | 0.17 | 2.21 | 6.0 | 14.31 | 0.01 | 97  |
| BATTERY 21 | 0.17 | 2.30 | 6.0 | 14.31 | 0.01 | 100 |
| BATTERY 22 | 0.17 | 2.40 | 6.0 | 14.32 | 0.02 | 102 |
| BATTERY 23 | 0.17 | 2.62 | 6.0 | 14.33 | 0.03 | 102 |
| BATTERY 24 | 0.17 | 2.70 | 6.0 | 14.34 | 0.04 | 100 |
| BATTERY 25 | 0.17 | 2.80 | 6.0 | 14.35 | 0.05 | 97  |
| BATTERY 26 | 0.10 | 2.11 | 6.0 | 14.30 | 0.00 | 94  |
| BATTERY 27 | 0.10 | 2.21 | 6.0 | 14.31 | 0.01 | 98  |
| BATTERY 28 | 0.10 | 2.30 | 6.0 | 14.33 | 0.03 | 101 |
| BATTERY 29 | 0.10 | 2.40 | 6.0 | 14.33 | 0.03 | 103 |
| BATTERY 30 | 0.10 | 2.62 | 6.0 | 14.34 | 0.04 | 102 |
| BATTERY 31 | 0.10 | 2.70 | 6.0 | 14.34 | 0.04 | 101 |
| BATTERY 32 | 0.10 | 2.80 | 6.0 | 14.39 | 0.09 | 97  |
| BATTERY 33 | 0.17 | 2.11 | 5.0 | 14.30 | 0.00 | 94  |
| BATTERY 34 | 0.17 | 2.21 | 5.0 | 14.31 | 0.01 | 98  |
| BATTERY 35 | 0.17 | 2.30 | 5.0 | 14.32 | 0.02 | 102 |
| BATTERY 36 | 0.17 | 2.40 | 5.0 | 14.33 | 0.03 | 103 |
| BATTERY 37 | 0.17 | 2.62 | 5.0 | 14.33 | 0.03 | 103 |
| BATTERY 38 | 0.17 | 2.70 | 5.0 | 14.34 | 0.04 | 102 |
| BATTERY 39 | 0.17 | 2.80 | 5.0 | 14.38 | 0.08 | 94  |
| BATTERY 40 | 0.17 | 2.11 | 4.4 | 14.30 | 0.00 | 93  |
| BATTERY 41 | 0.17 | 2.21 | 4.4 | 14.31 | 0.01 | 98  |
| BATTERY 42 | 0.17 | 2.30 | 4.4 | 14.33 | 0.03 | 102 |

TABLE 3-continued

|  | THICKNESS OF BODY OF BATTERY CASE [mm] | HALF-WIDTH OF 110 PLANE OF MANGANESE DIOXIDE UNDER X-RAY DIFFRACTION [DEGREES] | RATIO OF GRAPHITE ADDED INTO POSITIVE ELECTRODE [%] | OUTSIDE DIAMETER OF DEEPLY DISCHARGED BATTERY [mm] | INCREMENT OF BATTERY OUTSIDE DIAMETER [mm] | DISCHARGE PERFORMANCE [INDEX] |
|---|---|---|---|---|---|---|
| BATTERY 43 | 0.17 | 2.40 | 4.4 | 14.32 | 0.02 | 104 |
| BATTERY 44 | 0.17 | 2.62 | 4.4 | 14.33 | 0.03 | 104 |
| BATTERY 45 | 0.17 | 2.70 | 4.4 | 14.34 | 0.04 | 102 |
| BATTERY 46 | 0.17 | 2.80 | 4.4 | 14.40 | 0.10 | 92 |

The results of the batteries 19-46 show that with a decrease in the half-width of the 110 plane of manganese dioxide from 2.80 degrees to 2.11 degrees, the outside diameter of a deeply discharged battery decreases, and thus, the degree of swelling of the battery is reduced. The batteries 26-32 having a battery case having a body with a thickness of 0.10 mm also have a similar tendency, and an increase in the battery outside diameter appears to be more significantly reduced.

It is found that the half-width of the 110 plane similarly affects the batteries 33-39 in which the ratio of graphite added was low, such as 5.0%, and the batteries 40-46 in which the ratio of graphite added was lower, such as 4.4%.

As seen from, for example, the fact that the discharge performance of each of the batteries 29 and 30 is higher than that of each of the batteries 28 and 31, the discharge performance of each of batteries the half-width of a 110 plane of which is in the range from 2.40 degrees to 2.62 degrees is most preferable. The reason for this is that the degree of swelling of manganese dioxide having such properties in the last stage of discharge is low, resulting in not only a reduction in the swelling of a battery case, but also a low degree of restriction of ion migration in a positive electrode in the last stage of discharge.

For example, comparisons among the batteries 22, 36, and 43 show that while the side surfaces of battery cases of the batteries 22, 36, and 43 had the same thickness, and the half-widths of the 110 planes in the batteries 22, 36, and 43 were identical, the discharge performance of each of the batteries was improved with decreasing ratio of graphite added. By contrast, comparisons among the batteries 25, 39, and 46 show that the discharge performance decreased with decreasing ratio of graphite added. Such a phenomenon shows that while, with decreasing ratio of graphite added, the discharge performance of a battery using conventionally used manganese dioxide having low crystallinity decreases, the effect of reducing a decrease in the discharge performance of a battery using manganese dioxide the half-width of a 110 plane of which is in an appropriate range to improve the discharge performance is maximized.

(4) Relationship Between Theoretical Capacity of Negative Electrode and that of Positive Electrode Batteries 47-56 were each fabricated using the procedure including the above-described steps <1> to <7> except that the thickness of a body of a battery case was 0.17 mm, that the half-width of a 110 plane of manganese dioxide was 2.42 degrees or 2.65 degrees, and that the ratio of the theoretical capacity of a negative electrode to that of a positive electrode was varied between 1.00 and 1.27. As above, the outside diameter of each of the deeply discharged batteries and the discharge performance of the battery were determined. Table 4 shows determination results.

TABLE 4

|  | THICKNESS OF BODY OF BATTERY CASE [mm] | HALF-WIDTH OF 110 PLANE OF MANGANESE DIOXIDE UNDER X-RAY DIFFRACTION [DEGREES] | RATIO OF THEORETICAL CAPACITY OF NEGATIVE ELECTRODE TO THAT OF POSITIVE ELECTRODE | OUTSIDE DIAMETER OF DEEPLY DISCHARGED BATTERY [mm] | INCREMENT OF BATTERY OUTSIDE DIAMETER [mm] | DISCHARGE PERFORMANCE [INDEX] |
|---|---|---|---|---|---|---|
| BATTERY 47 | 0.17 | 2.42 | 1.00 | 14.33 | 0.03 | 98 |
| BATTERY 48 | 0.17 | 2.42 | 1.07 | 14.33 | 0.03 | 103 |
| BATTERY 49 | 0.17 | 2.42 | 1.12 | 14.32 | 0.02 | 104 |
| BATTERY 50 | 0.17 | 2.42 | 1.17 | 14.32 | 0.02 | 103 |
| BATTERY 51 | 0.17 | 2.42 | 1.25 | 14.32 | 0.02 | 99 |
| BATTERY 52 | 0.17 | 2.65 | 1.00 | 14.34 | 0.04 | 98 |
| BATTERY 53 | 0.17 | 2.65 | 1.07 | 14.34 | 0.04 | 102 |
| BATTERY 54 | 0.17 | 2.65 | 1.12 | 14.34 | 0.04 | 103 |
| BATTERY 55 | 0.17 | 2.65 | 1.17 | 14.33 | 0.03 | 102 |
| BATTERY 56 | 0.17 | 2.65 | 1.25 | 14.33 | 0.03 | 99 |

The results of the batteries 47-51 show that the ratio of the theoretical capacity of a negative electrode to that of a positive electrode is preferably between 1.07 and 1.17, because some of the batteries in which the ratio is in such a range provide high discharge performance. The reason for this is that in the last stage of discharge, the polarization of a positive electrode and the polarization of a negative electrode increase at substantially the same time, and the optimum ratio is between 1.07 and 1.17 until the battery voltage reaches a discharge end voltage. The batteries 52-56 have a similar tendency.

In the present invention, manganese dioxide having high crystallinity is used for a positive electrode; therefore, the swelling of the positive electrode in the last stage of discharge is reduced, not only the polarization of the positive electrode, but also the polarization of a negative electrode are reduced to a minimum, and as described above, the ratio of the theoretical capacity of the negative electrode to that of the positive electrode is optimized, thereby providing highest discharge performance.

INDUSTRIAL APPLICABILITY

The alkaline battery of the present invention offers high reliability and high discharge performance, and is suitably used for various devices using dry batteries as a power source.

| DESCRIPTION OF REFERENCE CHARACTERS | |
|---|---|
| 1 | BATTERY CASE |
| 1a | BODY |
| 1b | OPENING |
| 2 | POSITIVE ELECTRODE |
| 3 | NEGATIVE ELECTRODE |
| 4 | SEPARATOR |
| 5 | GASKET |
| 6 | NEGATIVE ELECTRODE CURRENT COLLECTOR |
| 7 | NEGATIVE ELECTRODE TERMINAL PLATE |
| 8 | EXTERIOR LABEL |

The invention claimed is:

1. An alkaline battery in which a positive electrode containing manganese dioxide and a negative electrode are contained in a cylindrical battery case having a closed bottom with a separator interposed between the positive and negative electrodes, and an opening of the battery case is sealed via a sealing plate with a gasket interposed between the battery case and the sealing plate, wherein
   a thickness of a body of the battery case is in a range of 0.10-0.17 mm, and
   a half-width of a 110 plane of the manganese dioxide measured by powder X-ray diffraction is in a range of 2.30-2.70 degrees.

2. The alkaline battery of claim 1, wherein the half-width is in a range of 2.40-2.62 degrees.

3. The alkaline battery of claim 1, wherein the negative electrode is made of zinc, and
   a ratio of a theoretical capacity of the negative electrode to that of the positive electrode is in a range of 1.07-1.17.

\* \* \* \* \*